US012730014B2

(12) United States Patent
Moriya et al.

(10) Patent No.: US 12,730,014 B2
(45) Date of Patent: Sep. 8, 2026

(54) WAFER TEMPERATURE SENSOR INCLUDING OPTICAL FIBER, WAFER TEMPERATURE SENSOR SYSTEM, AND METHOD OF MANUFACTURING WAFER TEMPERATURE SENSOR

(71) Applicant: Samsung Electronics Co., Ltd., Suwon-si (KR)

(72) Inventors: Yoshiaki Moriya, Yokohama (JP); Noriaki Imai, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 18/341,804

(22) Filed: Jun. 27, 2023

(65) Prior Publication Data

US 2024/0035903 A1 Feb. 1, 2024

(30) Foreign Application Priority Data

Aug. 1, 2022 (JP) ................................ 2022-122530
Feb. 20, 2023 (KR) ........................ 10-2023-0022124

(51) Int. Cl.
*G01K 11/3206* (2021.01)

(52) U.S. Cl.
CPC ................................ *G01K 11/3206* (2013.01)

(58) Field of Classification Search
CPC ......................... G01K 11/3206; G01K 15/005
See application file for complete search history.

(56) References Cited

U.S. PATENT DOCUMENTS

| | | | | |
|---|---|---|---|---|
| 5,042,898 | A * | 8/1991 | Morey | G02B 6/0218 385/37 |
| 6,442,312 | B1 * | 8/2002 | Terao | G02B 6/02152 385/27 |
| 2008/0160788 | A1 * | 7/2008 | Shive | H01L 21/3247 257/E21.317 |
| 2018/0261481 | A1 | 9/2018 | Eto | |
| 2019/0120703 | A1 | 4/2019 | Mitsunari et al. | |
| 2021/0118654 | A1 * | 4/2021 | O'Banion, IV | G01N 29/2418 |

FOREIGN PATENT DOCUMENTS

| | | | |
|---|---|---|---|
| JP | H0669785 | A | 3/1994 |
| JP | H109963 | A | 1/1998 |
| JP | 2002-071323 | A | 3/2002 |
| JP | 2002-245648 | A | 8/2002 |
| JP | 2002-277377 | A | 9/2002 |
| JP | 2002350248 | A | 12/2002 |
| JP | 2005-315635 | A | 11/2005 |
| JP | 2006-041429 | A | 2/2006 |

(Continued)

*Primary Examiner* — Peter J Macchiarolo
*Assistant Examiner* — Mireille S Sadate-Moualeu
(74) *Attorney, Agent, or Firm* — Wolf, Greenfield & Sacks, P.C.

(57) ABSTRACT

A wafer temperature sensor includes a first wafer, a second wafer, and a fiber bragg gratings (FBG)-type optical fiber, wherein the first wafer and the second wafer are bonded to each other, wherein at least one of a bonding surface of the first wafer and a bonding surface of the second wafer comprises a spiral groove, wherein the FBG-type optical fiber is in the spiral groove, and wherein the FBG-type optical fiber comprises a plurality of temperature measurement points in the spiral groove.

20 Claims, 5 Drawing Sheets

(56) References Cited

FOREIGN PATENT DOCUMENTS

| | | | | |
|---|---|---|---|---|
| JP | 2006-066809 A | | 3/2006 | |
| JP | 2008504535 A | | 2/2008 | |
| JP | 2010-091294 A | | 4/2010 | |
| JP | 2010-515261 A | | 5/2010 | |
| JP | 4809330 B2 | | 11/2011 | |
| JP | 2013-055099 A | | 3/2013 | |
| JP | 2016-058748 A | | 4/2016 | |
| JP | 6227711 B2 | | 11/2017 | |
| JP | 2018152542 A | | 9/2018 | |
| WO | WO 2010/098151 A1 | | 9/2010 | |
| WO | 2012047428 A2 | | 4/2012 | |
| WO | WO 2016/152599 A1 | | 9/2016 | |
| WO | 2017183471 A1 | | 10/2017 | |
| WO | WO 2018/235843 A1 | | 12/2018 | |
| WO | WO-2021127781 A1 | * | 7/2021 | ......... G01K 11/3206 |

* cited by examiner

WAFER TEMPERATURE SENSOR INCLUDING OPTICAL FIBER, WAFER TEMPERATURE SENSOR SYSTEM, AND METHOD OF MANUFACTURING WAFER TEMPERATURE SENSOR

CROSS-REFERENCE TO RELATED APPLICATION(S)

This application claims priority under 35 U.S.C. §119 to Korean Patent Application No. 10-2023-0022124 filed on Feb. 20, 2023 in the Korean Intellectual Property Office and Japanese Patent Application No. 2022-122530 filed on Aug. 1, 2022 in the Japan Patent Office, the disclosures of all of which are incorporated herein by reference in their entireties.

BACKGROUND

Example embodiments of the present invention relate to a wafer temperature sensor including optical fiber, a wafer temperature sensor system, and a method of manufacturing a wafer temperature sensor.

As a method for measuring a temperature of a silicon wafer processed by a semiconductor manufacturing device, three methods described below have been mainly used. A first method may be of attaching a temperature sensor to a wafer surface by bonding two different types of metal wires, measuring a weak voltage generated by a temperature difference, and converting the voltage into a temperature. A second method may be of measuring a temperature by inserting electronic components (e.g., a sensor, a CPU, a battery, a resistor, and a capacitor) used for measuring a temperature into a silicon wafer and performing similar process(es) using the same path in processing a wafer in a semiconductor manufacturing device using a temperature measurement tool. A third method may be of measuring a temperature by installing an excitation light-emitting element in a temperature measurement position in a wafer, outputting laser light to the excitation light-emitting element using an optical fiber and a reflector, and condensing reflected light from the excitation light-emitting element to a detector. For example, reference 1 suggests the first method. Also, as an example of the second method, an on-wafer of KLA TENCOR may be used. The on-wafer may have a structure in which two wafers may be laminated and electronic components (e.g., a sensor, a crystal oscillator, a CPU, a battery, a resistor, and a capacitor) used for temperature measurement may be inserted into a region between the wafers.

SUMMARY

However, each of the first to third methods has the issues as described below. First, in the case of the first method, when etching and film formation processes are performed in a chamber, plasma may be generated using a low frequency region (mainly 3 MHz to 13 MHz) and a high frequency region (mainly 60 MHz to 100 MHz) to perform those processes. However, a temperature of a substrate (e.g., a wafer) may not be measured because a voltage may not be detected due to the influence of electromagnetic waves from plasma.

Regarding the second method, when a component is disposed in a low-temperature environment, performance thereof may significantly deteriorate or may not operate normally, such that a temperature of a substrate may not be measured. For example, when a wafer is exposed to an environment with atmospheric pressure, a temperature of 20° C. or higher and humidity of 60% when a wafer temperature is 12° C. or lower, a dew condensation may occur in a measuring device and malfunction may occur in an internal CPU due to moisture. Also, in a low-temperature environment below 0° C., a battery capacity may be reduced, and an operating voltage may not be taken, such that the device may not operate normally.

The third method may only measure a temperature of a single point of a light emitting body with respect to a single optical fiber, such that, when measuring a temperature of multiple points in a large-area substrate, pieces of fibers corresponding to the number of measurement points may be used, and the entire configuration may become complex. Also, as the number of fibers increases, the number of grooves may also increase, such that strength of the substrate may be affected, and the wafers may be easily damaged.

According to example embodiments of the present invention, a wafer temperature sensor includes a first wafer, a second wafer, and a fiber bragg gratings (FBG)-type optical fiber, wherein the first wafer (e.g., a first surface of the first wafer) and the second wafer (e.g., a first surface of the second wafer) are bonded to each other, wherein at least one of the first surface of the first wafer and the first surface of the second wafer comprises a spiral groove, wherein the FBG-type optical fiber is in the spiral groove, and wherein the FBG-type optical fiber comprises a plurality of temperature measurement points in the spiral groove.

The wafer temperature sensor may measure temperature at multiple measurement points with a small number of optical fibers by disposing FBG optical fibers in the spiral grooves of the wafer (e.g., the first wafer and/or the second wafer).

A surface (e.g., a second surface) other than the bonding surface (e.g., the first surface) is formed of a material including one of elements Y (Yttrium), Al (Aluminium), and Si (Silicon), or is coated with a material including elements Y, Al, and Si.

Using the wafer temperature sensor according to example embodiments, damage caused by a plasma environment may be reduced.

The first wafer and the second wafer are formed of a material including one of elements Si, Al, Ga (Gallium), and In (Indium).

Using the wafer temperature sensor according to example embodiments, by using a commonly used substrate material for the sensor, consistency with a temperature profile during process(es) even in temperature measurement by the sensor may be assured.

The first wafer and the second wafer are bonded using a bonding adhesive having a Young's modulus of 10 MPa or less at 25° C. and a Young's modulus of 5000 MPa or less at −150° C.

Using the wafer temperature sensor according to example embodiments, possibility of separation of the wafers or damages to the wafers due to temperature change may be reduced.

Bonding surfaces of the first wafer and the second wafer, which may be polished to have a surface roughness (Ra) of 5 nm or less, are bonded by room-temperature bonding.

Using the wafer temperature sensor according to example embodiments, by using the room temperature bonding, since wafers may be bonded without an adhesive having poor heat conduction, the wafers may be sensitive to temperature change, and precision may be improved.

A plurality of spiral grooves are formed on a surface of a wafer (e.g., the first wafer) to which a wafer (e.g., or the second wafer) is bonded, and a plurality of FBG-type optical fibers are disposed in the grooves, respectively.

Using the wafer temperature sensor according to example embodiments, a temperature may be measured at multiple measurement points.

According to an example embodiment of the present disclosure, a wafer temperature sensor system includes a first wafer, a second wafer, a fiber bragg gratings (FBG)-type optical fiber, a detector including a light emitter and a light receiver, an optical cable configured to relay light between the FBG-type optical fiber and the detector, and a computer configured to process a signal from the light receiver, wherein the first wafer (e.g., a first surface of the first wafer) and the second wafer (e.g., a first surface of the second wafer) are bonded to each other, wherein at least one of the first surface of the first wafer and the first surface of the second wafer comprises a groove, wherein the FBG-type optical fiber is in the groove, and wherein the FBG-type optical fiber comprises a plurality of temperature measurement points in the groove.

By disposing the FBG optical fiber in the spiral groove of the wafer, a temperature may be measured at multiple measurement points with a relatively small number of optical fibers.

According to an example embodiment of the present disclosure, a method of manufacturing a wafer temperature sensor includes forming a spiral groove on at least one of the first wafer (e.g., a first surface of the first wafer) and the second wafer (e.g., a first surface of the second wafer) by sandblasting; disposing a FBG-type optical fiber in the spiral groove; and bonding the first wafer to the second wafer.

By disposing FBG optical fibers into spiral grooves of the wafer, a wafer temperature sensor measuring temperature at multiple measurement points with a small number of optical fibers may be manufactured.

BRIEF DESCRIPTION OF DRAWINGS

The above and other aspects, features, and advantages of the present invention will be more clearly understood from the following detailed description, taken in combination with the accompanying drawings, in which.

DETAILED DESCRIPTION

Hereinafter, some example embodiments of the present invention will be described as follows with reference to the accompanying drawings.

Figure 1:
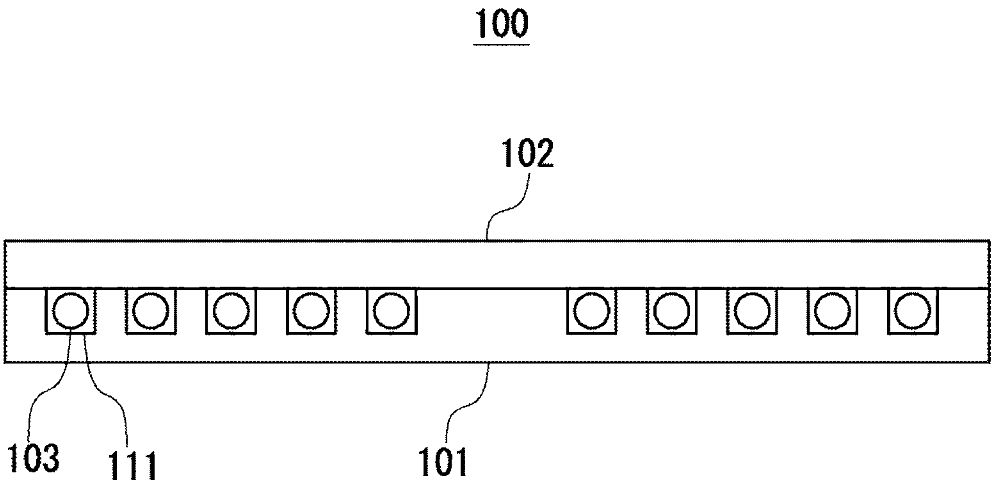
FIG. 1 is a cross-sectional diagram illustrating a wafer temperature sensor according to example embodiments of the present invention.
Figure 2:
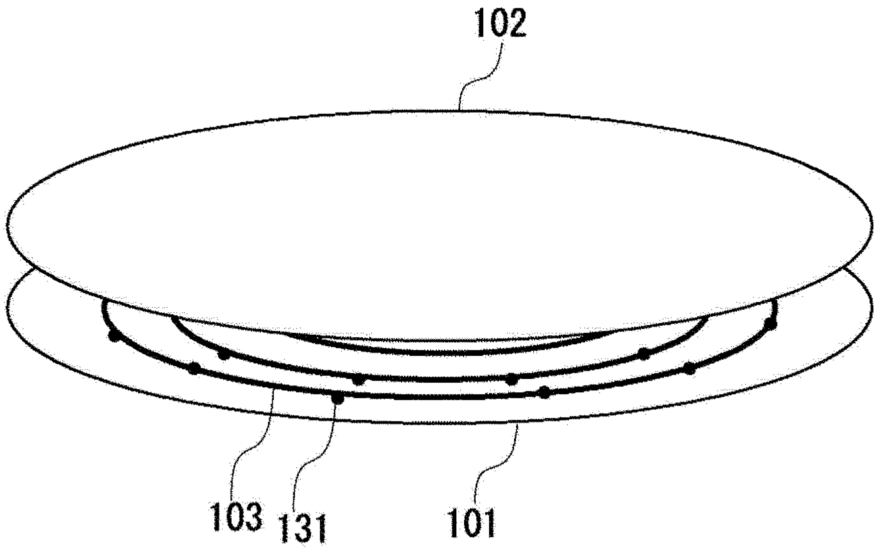
FIG. 2 is a diagram illustrating a first wafer and a second wafer of a wafer temperature sensor according to example embodiments of the present invention.

FIG. 1 is a cross-sectional diagram illustrating a wafer temperature sensor according to example embodiments of the present invention. FIG. 2 is a diagram illustrating a first wafer and a second wafer of a wafer temperature sensor according to example embodiments of the present invention.

Referring to FIG. 1, a wafer temperature sensor 100 may include a first wafer 101, a second wafer 102, and fiber bragg gratings (FBG)-type optical fiber 103. Also, the first wafer 101 and the second wafer 102 may be bonded to each other.

The first wafer 101 and the second wafer 102 may be bonded using a bonding adhesive (e.g., a bonding adhesive 113 in FIG. 3) having a Young's modulus of 10 MPa or less at 25° C. and a Young's modulus of 5000 MPa or less at −150° C. For example, by applying a bonding adhesive (e.g., a silicone adhesive) to bonding surfaces (also referred to as first surfaces) of the first wafer 101 and the second wafer 102, and curing the silicone adhesive in a state in which the first wafer 101 and the second wafer 102 are overlapped each other, the first wafer 101 and the second wafer 102 may be bonded by the curing. The bonding surfaces of the first wafer 101 and the second wafer 102 may face each other.

The first wafer 101 may be formed of, for example, a material including one of elements Si (Silicon), Al (Aluminium), Ga (Gallium), and In (Indium). For example, the first wafer 101 may include high-purity silicon.

The second wafer 102 may be formed of, for example, a material including one of Si, Al, Ga, and In. For example, the second wafer 102 may also include high-purity silicon.

In at least one of the first wafer 101 and the second wafer 102, a surface other than the bonding surface (also referred to as a second surface) may be formed of, for example, a material including one of elements Y (Yttrium), Al, and Si. Also, a surface other than the bonding surface of at least one of the first wafer 101 and the second wafer 102 may be coated with a material including, for example, elements Y, Al, and Si. The second surface of the first wafer is different from the first surface thereof, and the second surface of the second wafer is different from the first surface thereof. In some embodiments, the second surface of the first wafer may be opposite the first surface thereof, and the second surface of the second wafer may be opposite the first surface thereof.

In the first wafer 101, a spiral groove 111 may be formed in a surface (i.e., a bonding surface) to which a second wafer 102 is bonded. The number of spiral grooves 111 may be at least one. In some embodiments, multiple spiral grooves 111 may be formed.

The groove 111 may be formed by sandblasting. By forming the groove 111 by sandblasting, the groove may be manufactured using a less expensive device than forming by etching. If desired, the groove 111 may also be formed by etching.

The groove may be formed in at least one of bonding surfaces of the first wafer 101 and the second wafer 102. In some embodiments, the groove may be formed in the both bonding surfaces of the first wafer 101 and the second wafer 102.

The FBG-type optical fiber 103 may be implemented as an optical fiber including a grating in which a plurality of reflection patterns are arranged in a grid pattern. When light with a broad spectrum is incident to the grating, only specific wavelengths may be reflected. Depending on the temperature change, the length of the FBG-type optical fiber 103 may change. Accordingly, the spacing of the reflective patterns arranged in a lattice shape may also change. Accordingly, the wavelength of the reflected light may be determined according to the temperature.

The FBG-type optical fiber 103 may be disposed in the groove 111. Also, the FBG-type optical fiber 103 may have two or more temperature measurement points 131 in the groove 111.

Referring to FIG. 2, the temperature measurement point 131 is illustrated as a black circle to be distinct from the FBG-type optical fiber 103, and may have a structure in which light of a specific wavelength is reflected within the FBG-type optical fiber 103.

Figure 3:
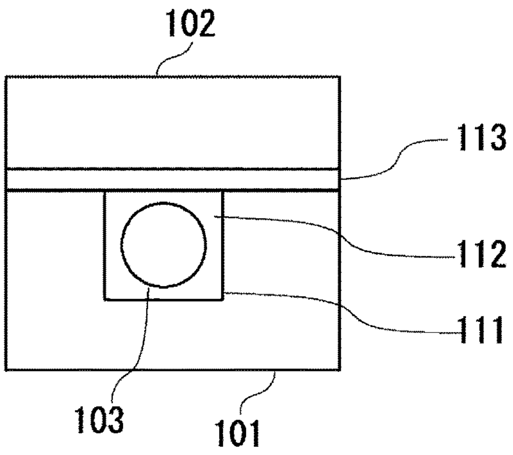
FIG. 3 is an enlarged diagram illustrating a portion of a cross-sectional surface of a wafer temperature sensor according to example embodiments of the present invention.

In the description below, a method of disposing the FBG-type optical fiber 103 in the groove 111 will be described. FIG. 3 is an enlarged diagram illustrating a portion of a cross-sectional surface of a wafer temperature sensor according to example embodiments of the present invention.

The FBG-type optical fiber 103 may be disposed in and fixed to the groove 111 using an adhesive 112 applied between the FBG-type optical fiber 103 and the groove 111. Specifically, the FBG-type optical fiber 103 may be fixed using an epoxy adhesive.

Figure 4:
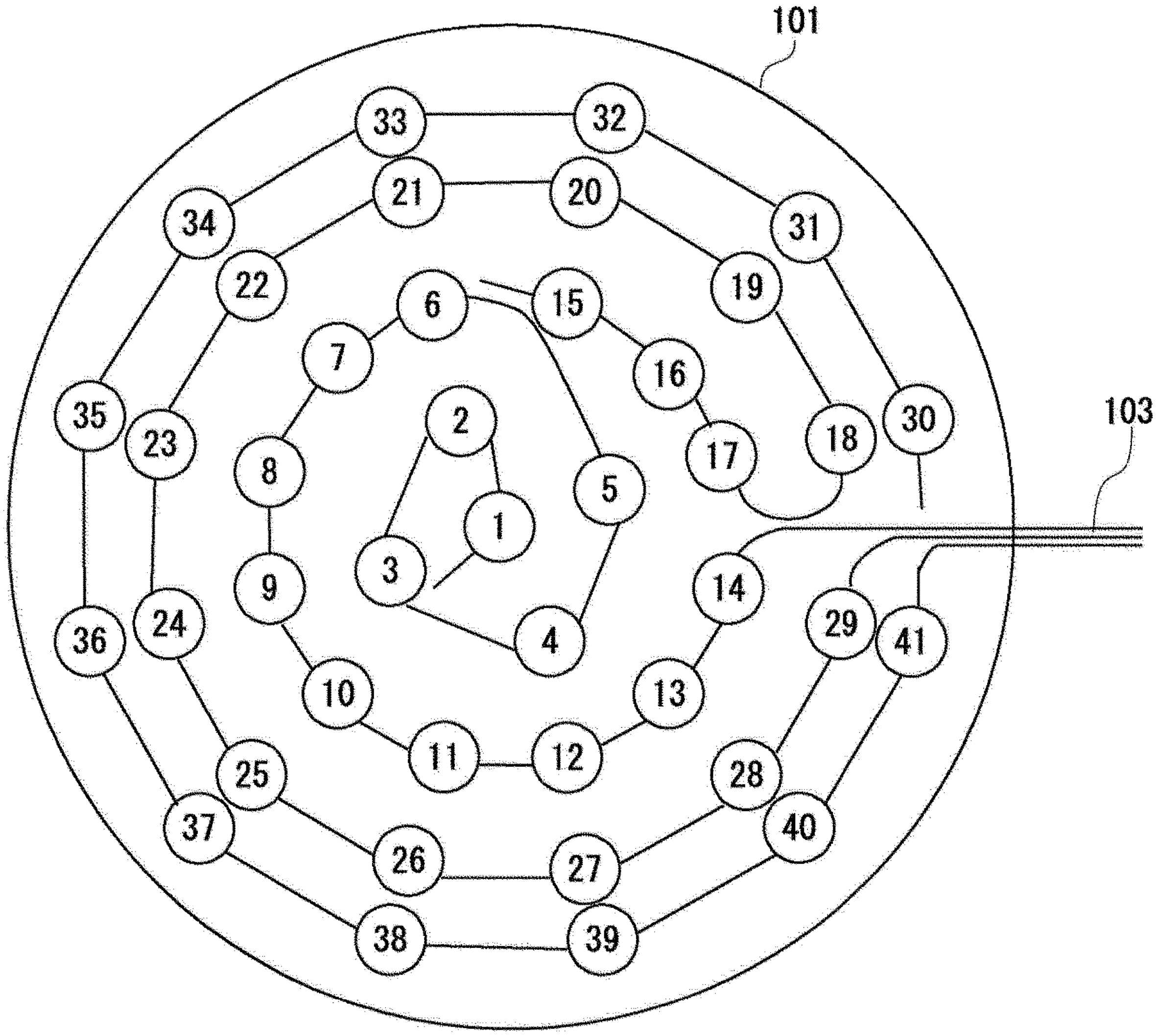
FIG. 4 is a diagram illustrating a wafer temperature sensor according to example embodiments of the present invention, viewed from above.

In the description below, the arrangement of the FBG-type optical fiber 103 will be described. FIG. 4 is a diagram illustrating a wafer temperature sensor according to example embodiments of the present invention, viewed from above. In some embodiments, as illustrated in FIG. 4, three pieces of FBG-type optical fibers 103 may be spirally arranged along the groove 111 formed in the first wafer 101. Referring to FIG. 4, circles with numbers may represent measurement points (e.g., temperature measurement points), and may not represent actual shapes. In an actual FBG-type optical fiber 103, a measurement point may have a structure in which light of a specific wavelength is reflected.

In some embodiments, as illustrated in FIG. 4, the FBG-type optical fiber 103 having the first to 14th measurement points 1-14, the FBG-type optical fiber 103 having 15th to 29th measurement points 15-29, the FBG-type optical fiber 103 having 30th to 41st measurement points 30-41 may be disposed.

Since the three pieces of FBG-type optical fibers 103, as illustrated in FIG. 4, are spirally disposed, the FBG-type optical fibers may be disposed without intersecting each other. Accordingly, the groove 111 may not need to have a complicated three-dimensional shape for the intersection between the FBG-type optical fibers 103. Accordingly, the groove 111 may be easily formed.

Also, the temperature may be measured at 41 temperature measurement points by the three pieces of FBG-type optical fibers 103. That is, the temperature of multiple measurement points may be measured with a relatively small number of pieces of optical fibers.

Figure 5:
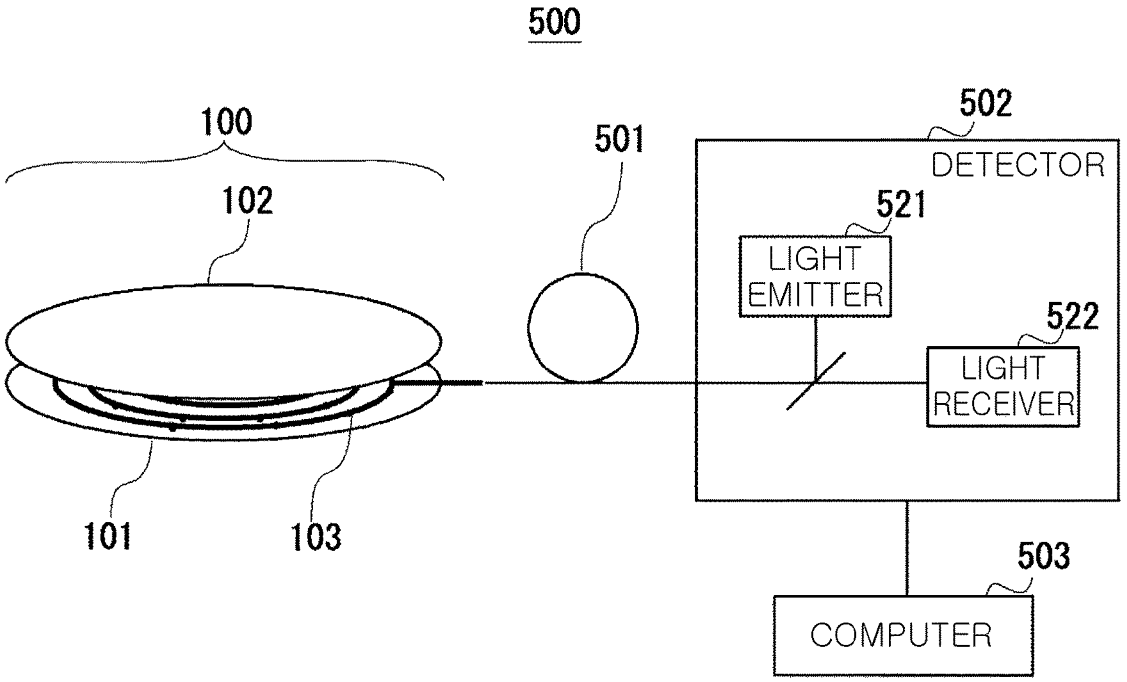
FIG. 5 is a diagram illustrating a wafer temperature sensor system according to example embodiments of the present invention.

In the description below, the configuration of the wafer temperature sensor system will be described. FIG. 5 is a diagram illustrating a wafer temperature sensor system according to example embodiments of the present invention. In FIG. 5, the same numerals are assigned to the same components as those in FIG. 1, and descriptions thereof will not be provided.

In FIG. 5, a wafer temperature sensor system 500 may include a wafer temperature sensor 100, an optical cable 501, a detector 502, and a computer 503. The detector 502 may include a light emitter 521 and a light receiver 522.

The optical cable 501 may be an optical cable for relaying light between the FBG-type optical fiber 103 and the detector 502.

The light emitter 521 may output light into the FBG-type optical fiber 103 via the optical cable 501.

The light receiver 522 may receive light reflected from each measurement point (e.g., temperature measurement point) of the FBG-type optical fiber 103 via the optical cable 501. The light receiver 522 may convert received light into an electrical signal. Also, the light receiver 522 may output an electrical signal to the computer 503.

The computer 503 may process an electrical signal from the light receiver 522. Specifically, the computer 503 may calculate the temperature from a peak wavelength of light received by the light receiver 522. To accurately calculate the temperature, a calibration curve may be created in advance for the relationship between a peak wavelength and temperature.

Figure 6:
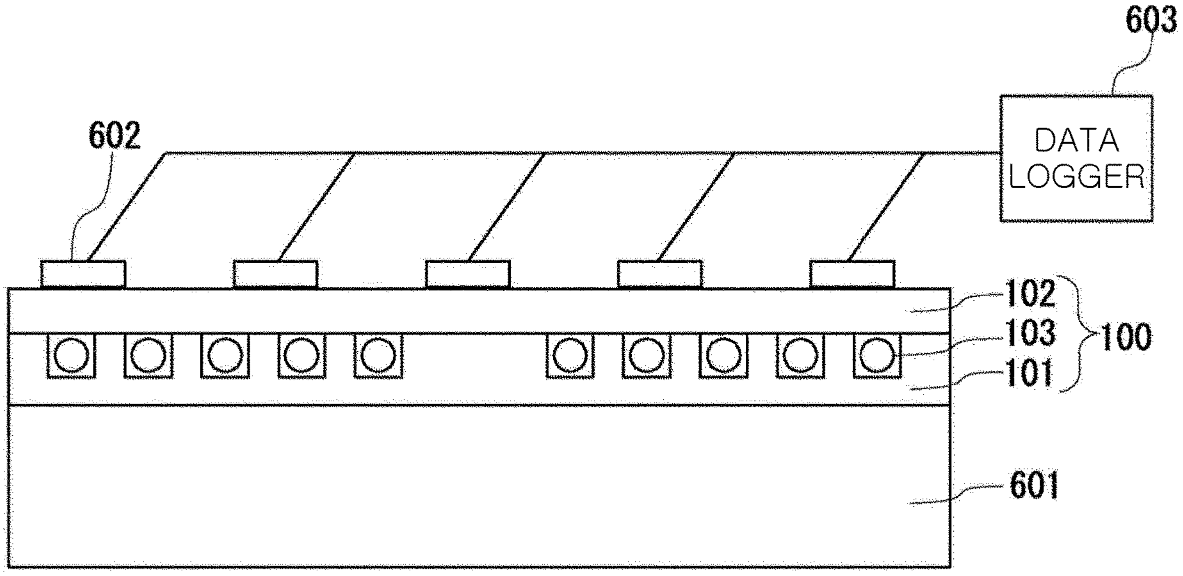
FIG. 6 is a diagram illustrating an example of preparing a calibration curve of a wafer temperature sensor according to example embodiments of the present invention.

FIG. 6 is a diagram illustrating an example of preparing a calibration curve of a wafer temperature sensor according to example embodiments of the present invention. As illustrated in FIG. 6, while heating the wafer temperature sensor 100 with a heater 601, the temperature measured by a thermocouple 602 may be recorded by a data logger 603. Also, a calibration curve may be created by matching the peak wavelength of light detected by the light receiver 522 of the wafer temperature sensor 100 with the temperature measured by the thermocouple 602.

Figure 7:
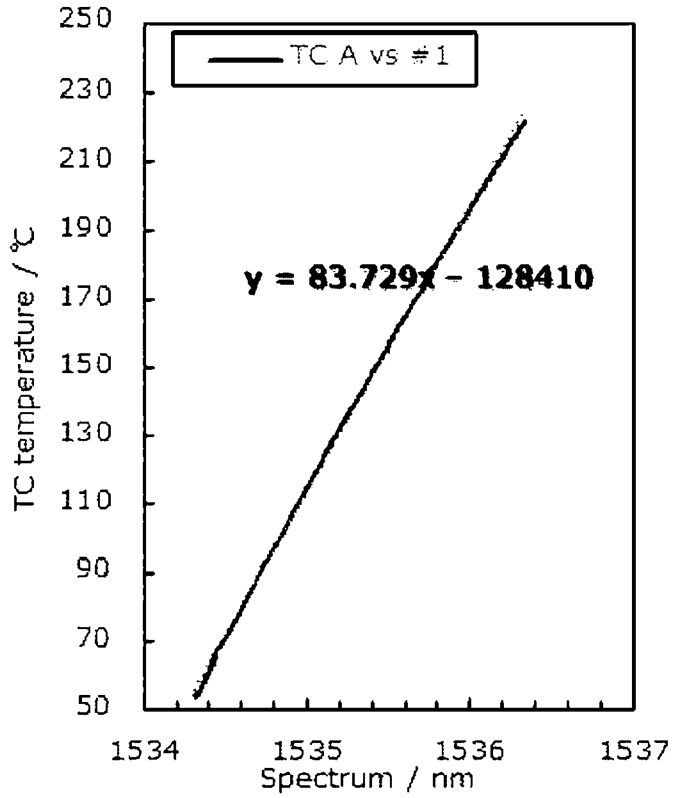
FIG. 7 is a graph illustrating an example of a calibration curve of a wafer temperature sensor according to example embodiments of the present invention.

FIG. 7 is a graph illustrating an example of a calibration curve of a wafer temperature sensor according to example embodiments of the present invention. In FIG. 7, the vertical axis may be the measured temperature, and the horizontal axis may be the peak wavelength of the received light. In the graph in FIG. 7, a calibration curve may be created in the temperature range of 50 to 220° C.

Figure 8:
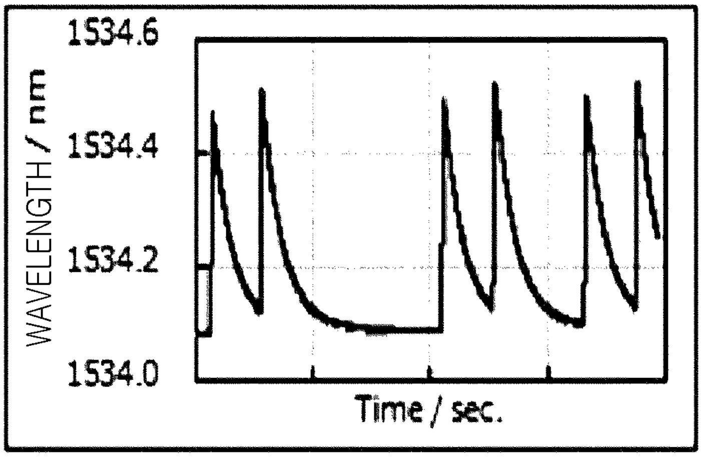
FIG. 8 is a graph illustrating an example of a spectrum of a wafer temperature sensor according to example embodiments of the present invention.

In the description below, a wafer temperature sensor 100 may be mounted on a stage of which a temperature is not identified, and a wavelength may be measured while irradiating plasma in a vacuum chamber. FIG. 8 is a graph illustrating an example of a spectrum of a wafer temperature sensor according to example embodiments of the present invention.

As a result of measuring the process temperature from the obtained wavelength and the calibration curve, the temperature of the wafer during plasma irradiation may be 70 to 74° C.

Thereafter, a calibration curve may be prepared and the temperature may be measured in a low-temperature band of 0° C. or less.

Figure 9:
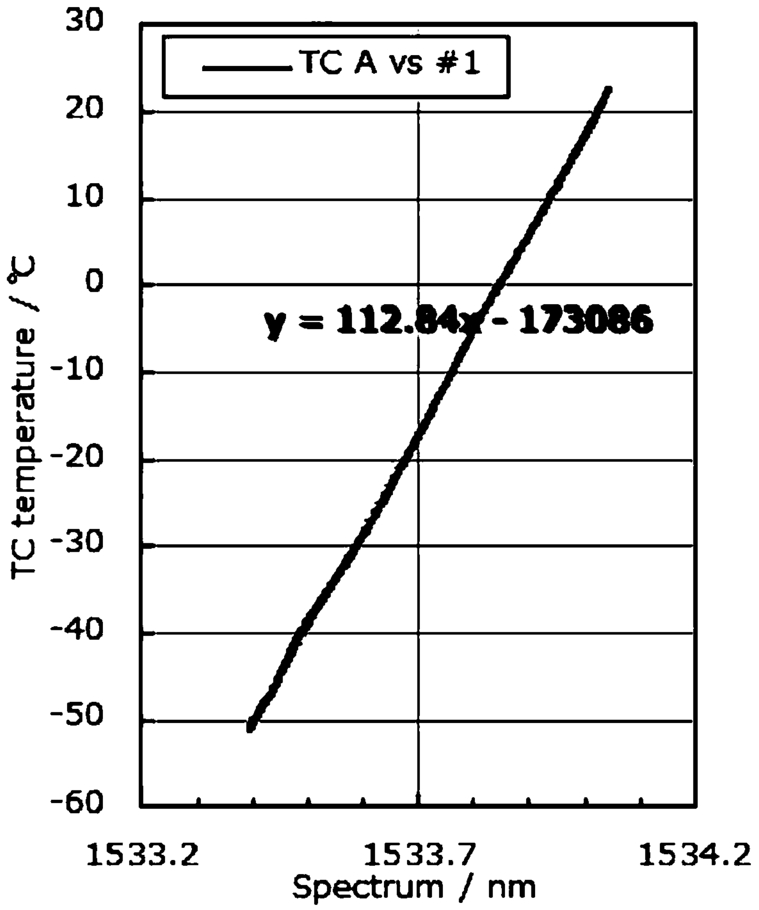
FIG. 9 is a graph illustrating an example of a calibration curve of a wafer temperature sensor according to example embodiments of the present invention.

The calibration curve may be equally performed in the assumed temperature range (−55 to 25° C.). FIG. 9 is a graph illustrating an example of a calibration curve of a wafer temperature sensor according to example embodiments of the present invention. The vertical axis may be the measured temperature, and the horizontal axis may be a peak wavelength of received light. In the graph in FIG. 9, a calibration curve may be created at −55 to 25° C.

Figure 10:
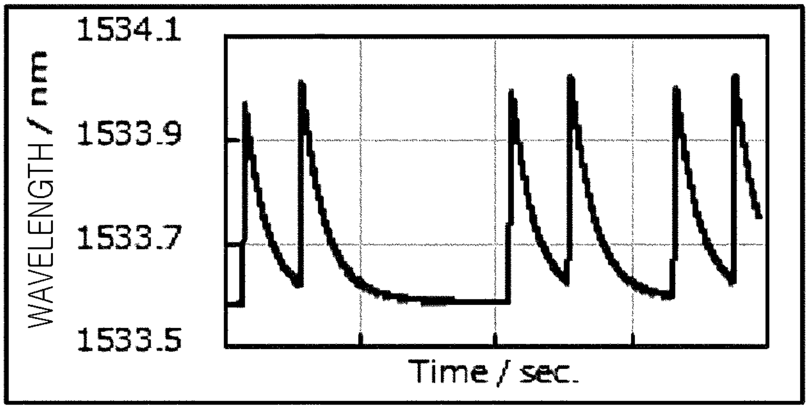
FIG. 10 is a graph illustrating an example of a spectrum of a wafer temperature sensor according to example embodiments of the present invention.

In the description below, a temperature sensor may be mounted on a stage of which temperature is not identified, and a wavelength may be measured while cooling the stage in a vacuum chamber. FIG. 10 is a graph illustrating an example of a spectrum of a wafer temperature sensor according to example embodiments of the present invention. As a result of measuring the temperature from the obtained wavelength and calibration curve, the temperature of the wafer may be −42 to −39° C.

Using the wafer temperature sensor and the wafer temperature sensor system according to example embodiments described above, a wafer temperature may be measured under high-frequency conditions during plasma irradiation or under low-temperature conditions of 0° C. or less at a point in which the temperature is measured according to the wavelength of light which may be difficult to be affected by the external environment and the physical change in a width of a grating (reflector) manufactured in the fiber.

Also, using the wafer temperature sensor and the wafer temperature sensor system according to example embodiments, by covering the optical fiber with a wafer, the optical fiber may be protected from plasma and reactive gases, and a temperature of a wafer surface may be accurately measured.

Also, using the wafer temperature sensor and the wafer temperature sensor system according to example embodiments, by disposing the FBG-type optical fiber in the spiral groove of the wafer, a temperature may be measured at multiple measurement points using a relatively small number of optical fibers.

Also, in the example embodiment, the first wafer 101 and the second wafer 102 may be bonded by room-temperature bonding of the bonding surfaces that may be polished to have a surface roughness (Ra) of 5 nm or less.

Other components and manufacturing methods may be the same as those in the example embodiment described above.

Also, as in the example embodiment, as a result of measuring the temperature during plasma irradiation and cooling, it was confirmed that the temperatures were 70 to 72° C. and −42 to −40° C.

Using the room temperature bonding as above, wafers may be bonded without using an adhesive having poor heat conduction, and sensitivity to temperature change may be increased such that precision may improve.

Embodiments of the present invention are not limited to the example embodiments described above, and may be modified without departing from the gist and the scope of the present invention.

For example, each element described in the drawing as a functional block performing various processes may be configured with a CPU, memory, and other circuits in terms of hardware, and a program loaded into memory in terms of software. Accordingly, it is understood by those skilled in the art that the functional blocks may be realized in various forms by only hardware, only software, or a combination thereof, and may be limited thereto.

Also, the above-described program may be stored using various types of non-transitory computer readable media and may be supplied to a computer. Non-transitory computer readable media may include recording media having various types. Examples of non-transitory computer readable media may include magnetic recording media (e.g., flexible disks, magnetic tapes, hard disk drives), magneto-optical recording media (e.g., magneto-optical disks), Read Only Memory (CD-ROM), CDs, CD-R/W, and a semiconductor memory (e.g., mask ROM, programmable ROM (PROM), erasable PROM (EPROM), flash ROM, random access memory (RAM)). Also, the program may be supplied to a computer by various types of transitory computer readable media. Examples of temporary computer-readable media may include electrical signals, optical signals, and electromagnetic waves. Temporary computer-readable media may include wired communication channels such as an electric wire and optical fiber, or via a wireless communication path, and may supply the program to the computer.

According to the aforementioned example embodiments, the wafer temperature sensor using optical fiber, the wafer temperature sensor system, and the method of manufacturing a wafer temperature sensor may measure a temperature at multiple measurement points using a relatively small number of optical fibers by disposing the FBG-type optical fibers in the spiral groove of the wafer.

While the example embodiments have been illustrated and described above, it will be configured as apparent to those skilled in the art that modifications and variations could be made without departing from the scope of the present invention as defined by the appended claims.

What is claimed is:

1. A wafer temperature sensor comprising:

a first wafer, a second wafer, and a plurality of fiber bragg gratings (FBG)-type optical fibers, wherein a first surface of the first wafer and a first surface of the second wafer are bonded to each other, wherein at least one of the first surface of the first wafer and the first surface of the second wafer comprises a plurality of spiral grooves, wherein each FBG-type optical fiber, of the plurality of FBG-type optical fibers, is in a respective groove of the plurality of spiral grooves, and wherein the FBG-type optical fiber comprises a plurality of temperature measurement points in the spiral groove.

2. The wafer temperature sensor of claim 1, wherein each of the first wafer and the second wafer comprises a second surface that is different from the first surface thereof, at least one of the second surface of the first wafer and the second surface of the second wafer comprises a material including one of Y (Yttrium), Al (Aluminium), and Si (Silicon) or is coated with a material including Y, Al, and Si.

3. The wafer temperature sensor of claim 1, wherein the first wafer and the second wafer comprise a material including one of Si, Al, Ga (Gallium), and In (Indium).

4. The wafer temperature sensor of claim 1, wherein the first surfaces of the first wafer and the second wafer are bonded to each other using a bonding adhesive having a Young's modulus of 10 MPa or less at 25° C. and a Young's modulus of 5000 MPa or less at −150° C.

5. The wafer temperature sensor of claim 1, wherein each of the first surfaces of the first wafer and the second wafer has a surface roughness (Ra) of 5 nm or less.

6. The wafer temperature sensor of claim 1, wherein the plurality of spiral grooves do not intersect each other.

7. The wafer temperature sensor of claim 1, wherein each of the plurality of FBG-type optical fibers comprises two or more temperature measurement points.

8. The wafer temperature sensor of claim 7, wherein a number of the two or more temperature measurement points included in a first FBG-type optical fiber among the plurality of FBG-type optical fibers is different from a number of the two or more temperature measurement points included in a second FBG-type optical fiber among the plurality of FBG-type optical fibers.

9. The wafer temperature sensor of claim 1, wherein each of the plurality of temperature measurement points comprises a grating for reflecting a light of a specific wavelengths.

10. The wafer temperature sensor of claim 9, wherein distances between patterns included in the grating change based on temperature change.

11. The wafer temperature sensor of claim 9, wherein the FBG-type optical fiber comprises a plurality of FBG-type optical fibers, and the spiral groove comprises a plurality of spiral grooves, and the plurality of FBG-type optical fibers are fixed in the plurality of spiral grooves by an epoxy adhesive.

12. The wafer temperature sensor of claim 1, wherein each groove of the plurality of spiral grooves has a different spacing relative to a center of the first surface of the first wafer.

13. A wafer temperature sensor comprising:

a first wafer;

a second wafer bonded to the first wafer; and a plurality of fiber bragg gratings (FBG)-type optical fibers disposed in a plurality of spiral grooves included in at least one of the first wafer and the second wafer, wherein each of the plurality of FBG-type optical fibers comprises a plurality of temperature measurement points, wherein the plurality of FBG-type optical fibers do not intersect each other and each FBG-type optical fiber, of the plurality of FBG-type optical fibers is in a respective groove of the plurality of spiral grooves, and wherein each of the plurality of temperature measurement points comprises a grating in which a plurality of reflective patterns having spacing changed by temperature are disposed.

14. The wafer temperature sensor of claim 13, wherein, in the grating, the reflective patterns are arranged in a lattice shape.

15. The wafer temperature sensor of claim 13, further comprising:

a bonding adhesive disposed between the first wafer and the second wafer to bond the first wafer and the second wafer each other, wherein the bonding adhesive has a Young's modulus of 10 MPa or less at 25° C. and a Young's modulus of 5000 MPa or less at −150° C.

16. The wafer temperature sensor of claim 13, wherein the plurality of FBG-type optical fibers are embedded in the plurality of spiral grooves formed in a bonding surface of each of the first wafer and the second wafer.

17. A wafer temperature sensor system comprising:

a first wafer, a second wafer, a plurality of fiber bragg gratings (FBG)-type optical fibers, a detector including a light emitter and a light receiver, an optical cable configured to relay light between the FBG-type optical fiber and the detector, and a computer configured to process a signal from the light receiver, wherein a first surface of the first wafer and a first surface of the second wafer are bonded to each other, wherein at least one of the first surface of the first wafer and the first surface of the second wafer comprises a plurality of spiral grooves, wherein each FBG-type optical fiber, of the plurality of FBG-type optical fibers, is in a respective groove of the plurality of spiral grooves, and wherein the FBG-type optical fiber comprises a plurality of temperature measurement points in the groove.

18. The wafer temperature sensor system of claim 17, wherein each of the first surfaces of the first wafer and the second wafer has a surface roughness (Ra) of 5 nm or less.

19. The wafer temperature sensor system of claim 17, wherein the FBG-type optical fiber comprises a plurality of FBG-type optical fibers, and the groove comprises a plurality of spiral grooves, and wherein the plurality of FBG-type optical fibers are in the plurality of spiral grooves, respectively.

20. The wafer temperature sensor system of claim 19, the plurality of spiral grooves do not intersect each other.

* * * * *